(12) United States Patent
Cedertorn et al.

(10) Patent No.: US 10,439,274 B2
(45) Date of Patent: Oct. 8, 2019

(54) PIVOT AXLE ARRANGEMENT

(71) Applicant: SAAB AB, Linköping (SE)

(72) Inventors: Daniel Cedertorn, Gothenburg (SE); Johan Östberg, Gothenburg (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 15/537,300

(22) PCT Filed: Dec. 19, 2014

(86) PCT No.: PCT/SE2014/051553
§ 371 (c)(1),
(2) Date: Jun. 16, 2017

(87) PCT Pub. No.: WO2016/099366
PCT Pub. Date: Jun. 23, 2016

(65) Prior Publication Data
US 2017/0346171 A1 Nov. 30, 2017

(51) Int. Cl.
H01Q 1/12 (2006.01)
H01Q 1/32 (2006.01)
(Continued)

(52) U.S. Cl.
CPC ......... H01Q 1/3233 (2013.01); F16C 11/045 (2013.01); H01Q 1/1235 (2013.01); H01Q 1/3275 (2013.01); H01Q 3/04 (2013.01)

(58) Field of Classification Search
CPC ....... F16C 11/045; H01Q 1/12; H01Q 1/1235; H01Q 1/32; H01Q 1/3208; H01Q 1/3233; H01Q 3/04
See application file for complete search history.

(56) References Cited

U.S. PATENT DOCUMENTS

| 3,412,404 | A | * | 11/1968 | Bergling | ................ | H01Q 1/084 |
| | | | | | | 343/714 |
| 4,309,708 | A | * | 1/1982 | Sayovitz | .............. | H01Q 15/162 |
| | | | | | | 343/713 |

(Continued)

FOREIGN PATENT DOCUMENTS

| EP | 0291864 A | 11/1988 |
| EP | 2293378 A1 | 3/2011 |

(Continued)

OTHER PUBLICATIONS

International Search Report of PCT/SE2014/051553, dated Sep. 14, 2015.

(Continued)

*Primary Examiner* — Tho G Phan
(74) *Attorney, Agent, or Firm* — Venable LLP; Jeffri A. Kaminski

(57) ABSTRACT

The disclosure relates to a pivot axle arrangement for providing the two structural elements are pivotally movable in relation to each other. The pivot axle arrangement comprises a first and a second axle spindle for holding an outer axle, a first and a second bearing element and the outer axle. The outer axle is formed as a hollow cylinder. An inner axle is concentrically arranged in a longitudinal direction inside of the outer axle such that the inner axle extends between said first and second axle spindle. The ends of the inner axle are fastened to the first and second axle spindles by a first and second fastening means such that the first and second axle spindles are interconnected via said inner axle.

17 Claims, 5 Drawing Sheets

(51) Int. Cl.
*H01Q 3/04* (2006.01)
*F16C 11/04* (2006.01)

(56) References Cited

U.S. PATENT DOCUMENTS

| | | | | |
|---|---|---|---|---|
| 4,663,633 A * | 5/1987 | Wilson | ............... | H01Q 1/084 |
| | | | | 343/714 |
| 5,554,998 A | 9/1996 | Sherwood et al. | | |
| 5,999,139 A | 12/1999 | Benjamin et al. | | |
| 6,421,019 B1 * | 7/2002 | Albertelli | ............ | H01Q 1/3216 |
| | | | | 343/713 |
| 6,573,871 B2 * | 6/2003 | Drews | ............... | E04H 5/02 |
| | | | | 343/713 |
| 7,230,581 B2 * | 6/2007 | McEwan | ............ | H01Q 1/325 |
| | | | | 343/711 |
| 7,518,569 B1 * | 4/2009 | Conrad | ............... | H01Q 1/08 |
| | | | | 343/713 |
| 7,815,373 B2 | 10/2010 | Bauza et al. | | |
| 2017/0346171 A1 | 11/2017 | Cedertorn et al. | | |

FOREIGN PATENT DOCUMENTS

| | | |
|---|---|---|
| EP | 3235055 A1 | 10/2017 |
| WO | 2006020863 A2 | 2/2006 |
| WO | 2008128077 A1 | 10/2008 |
| WO | 2012164352 A1 | 12/2012 |
| WO | 2016099366 A1 | 6/2016 |

OTHER PUBLICATIONS

Written Opinion of PCT/SE2014/051553, dated Sep. 14, 2015.
European Search Report dated Jul. 25, 2018 in corresponding European Patent Application No. 14908530.0 (12 pages).
Australian Examination report dated Mar. 15, 2019 in corresponding Australian Patent Application No. 2014414121 (4 pages).

* cited by examiner

Prior Art

PIVOT AXLE ARRANGEMENT

CROSS-REFERENCES TO RELATED APPLICATIONS

This application is a U.S. National Stage application of PCT/SE2014/051553, filed 19 Dec. 2014 and published on 23 Jun. 2016 as WO 2016/099366 which is hereby incorporated by reference in its entirety.

TECHNICAL FIELD

The present disclosure relates to a pivot axle arrangement for providing two structural elements to be pivotally movable in relation to each other. The disclosure is applicable for pivot joints where stringent requirements apply regarding rigid construction. The present disclosure is suitable e.g. for a pivotally radar antenna. Although the disclosure will be described with respect to a radar antenna, the present disclosure is not restricted to this particular use.

BACKGROUND

Pivot joints arranged for facilitating that structural elements such as an antenna, a mast or like may be pivoted between an upraised position and a lowered position is generally exposed to significant forces in essentially all directions. The antenna or like may itself be quite heavy and in upraised position also the height of the antenna, especially when being exposed to e.g. wind, imply great stress to the joint where the pivotally antenna is fastened. For applications where the antenna or like is fastened by a pivot joint to a vehicle the pivot joint will also be exposed to other forces e.g. during transport in harsh terrain. In order for the pivot joint to work properly at such conditions, not wear down to quickly and not be dislocated the material thickness of the components associated with the pivot joint often have to be larger than what is desired and the requirements regarding manufacturing tolerances are often very restrictive. Small tolerances and excessive material thickness are undesirable from a cost and weight perspective.

Conventional pivot joints for pivotally antennas or like generally consist of a pivot axle which is rotationally arranged at respective end in a pivot axle fastener. Both pivot axle fasteners contributes to absorbing forces in radial direction exerted on the pivot axle but only one of the pivot axle fasteners absorb the forces if being applied in a direction essentially parallel with the pivot axle. Thus, if such a pivot joint is exposed to shock forces, for example during transport when driving on a bumpy road, in an axial direction there is an imminent risk that the pivot axle will be separated from the pivot axle fastener if not the pivot axle fastener is sufficiently rigid.

However, it is not sufficient that the pivot axle fasteners are sufficiently rigid. Also the structural element on which the pivot axle fasteners are arranged needs to be able to absorb the forces exerted by the pivot axle fasteners. If being arranged on a vehicle, such structural element may e.g. be a load platform of a truck or the roof of a terrain vehicle. Thus also the load platform, the roof etc. needs to be designed or reinforced in order to prevent the pivot axle from been dislocated from axial forces.

When in upraised position, and during operation when the antenna is rotating, another aspect that needs to be considered is the mechanical resonance. Mechanical resonance is the tendency of a mechanical structure to respond at greater amplitude when the frequency of its oscillations matches the natural frequency of the structure. A rotating antenna exposed to incident wind will be exposed to a pulsating force due to that the surface of the antenna that is exposed to the incident wind will vary as the antenna rotates. Such pulsating force may cause the antenna structure to start to oscillate. If such oscillations coincide with the natural frequency of the structure the oscillations will escalate which ultimately may break the antenna structure. For a radar antenna the performance of the antenna will also be significantly impaired by such oscillations. The oscillation caused is dependent on the rotating speed of the antenna.

A rigid fastening, without any glitches, raises the natural frequency wherein the natural frequency may be raised to be higher than the frequencies which the antenna structure may be exposed to due to rotating in windy conditions. A rigid antenna structure and rising of the natural frequency improves the stability and durability of the antenna. Also, the more stable the antenna is, the better, and more accurate, will e.g. a radar image obtained by such an antenna be.

In order for a pivot joint to work properly it is also important that the inherent pivot resistance, counteracting the pivot movement of the joint, is configured accurately. For applications where a pivot joint is used for lowering and raising antennas or like the inherent pivot resistance is important for dampening the rotational movement since the leverage effect is significant, especially when lowering the antenna. However, as the pivot joint is being worn the inherent pivot resistance will gradually decrease, wherein the dampening effect will be lost.

Thus, there is a need for further improvements.

SUMMARY

An object of the present disclosure is to provide a pivot axle arrangement overcoming the previously mentioned drawbacks. The object is achieved by the present disclosure according to claim 1. A further object of the present disclosure is to provide a pivot axle arrangement with increased lifetime and improved durability. Yet a further object of the present disclosure is to provide a method for assembling the pivot axle arrangement. Further effects are provided by the present disclosure as disclosed in the dependent claims and throughout the specification.

Pivot joints are generally designed to absorb forces in radial direction. However, pivot joints used for the application primarily addressed herein, pivot joints for enabling e.g. a radar antenna to be pivotally arranged on the roof of a terrain vehicle or like, are also exposed to significant force in axial direction. When a conventional pivot joint, such as the exemplifying prior art pivot joint described in relation to FIG. 2 below, is exposed to axial forces all forces needs to be absorbed solely, or at least to a much greater extent, by one of the pivot axle fasteners of the pivot joint. Thus, the pivot axle fasteners needs to be dimensioned accordingly making them heavy and bulky. It is also required that the structural element the pivot axle fastener is arranged to is designed to withstand such forces. Thus, also the structural elements surrounding the pivot axle fasteners are affected. For many applications, such as when the cost, weight restrictions or available space is restricting, this is a significant problem.

This problem is solved by the present disclosure by providing a more stable pivot axle arrangement. By providing a more stable pivot axle arrangement the pivot axle fasteners do not have to be as strong and rigid, thus also the structure the pivot axle fastener is arranged to do not have to be as strong and rigid.

The present disclosure comprises a pivot axle arrangement for providing that two structural elements, arranged to the pivot axle arrangement, are pivotally movable in relation to each other. Examples of such structural elements may e.g. be a radar antenna, a radar mast or like that is pivotally mounted on the roof of a vehicle or on a building.

The pivot axle arrangement comprises

A first and a second axle spindle for holding an outer axle.

The first axle spindle comprises a first axle support portion and a first fastener support portion and the second axle spindle comprises a second axle support portion and a second fastener support portion. The axle spindles, thus also the axle support portions and the fastener support portions, have circular cross sectional areas.

A first and a second bearing element.

The first and second bearing elements are provided to be arranged between the axle support portions of the axle spindles and a first and second end portion arrangement of an outer axle, wherein the first and second end portion arrangements are provided in opposite outer ends of the outer axle, such that the axle spindles and the outer axle are rotationally arranged to each other. Thus, either the first bearing element is, at least partially, mounted on the first axle support portion and the second bearing element is, at least partially, mounted on the second axle support portion, such that the first and second bearing elements at least partially encloses respective axle support portion, or the first and second bearing element is mounted to a first and second end portion arrangements of the outer axle. Regardless of if the bearings are arranged to the axle support portions or the end portion arrangements, when the pivot axle arrangement is assembled the outer axle is arranged to the axle spindles the bearings are arranged between the axle support portion and the end portion arrangement at respective end.

An outer axle having a circular cross section.

The outer axle is formed as a cylindrical tube, hollow in the longitudinal direction, and comprises the first and the second end portion arrangement at respective opposite first and second ends of the outer axle. Also the first and second end portion arrangements are formed as hollow cylinders.

The first and second end portion arrangement of the outer axle is pivotally mounted to the first and second bearing element of the first and second axle spindle such that the outer axle is pivotally arranged in relation to the first and second axle spindles. The axle support portions, provided with the bearing elements, are configured to protrude into respective first and second end portion arrangement of the outer axle such that the axle support portions are rotationally arranged to respective first and second end portion arrangements via the bearing elements. The first and second fastener support portions are preferably arranged in a first and second pivot axle fastener of a structural element. The present disclosure is further characterized in that an inner axle, having a first and second inner axle end provided on opposite ends of the inner axle, is concentrically arranged in a longitudinal direction inside of the outer axle. The inner axle extends between the first and second axle spindle and the first and second inner axle ends are fastened to the first and second axle spindles by a first and second fastening means. Depending on how the fastening means are designed, which is something that will be discussed more in detail later, the inner axle may either extend into respective axle spindle, just to respective axle spindle or close to respective axle spindle. The first and second axle spindles are interconnected via the inner axle, and respective first and second inner axle end is fastened to respective first and second axle spindle by the first and second fastening means. Thereby the first and second axle spindles are prevented from being further separated in an axial direction by the inner axle. When in operation the outer axle may rotate, wherein a structural element arranged to the outer axle may be pivoted, whereas the inner axle is fixated and does not rotate.

Preventing the axle spindles from separating has the advantage that when an axial force is acting on the pivot axle arrangement both axle spindles, thus both pivot axle fasteners in which the axle spindles are arranged when in use, contribute to absorbing the axial force instead of just one of the axles spindles. This has the advantage that the pivot axle fasteners do not need to be dimensioned to withstand as large forces one by one, and also the surrounding structural elements may not need to be able to withstand the same forces since the forces propagating through pivot axle fasteners is divided between two fasteners instead of just one.

For clarification; the present disclosure relates to a pivot axle arrangement comprising two axle spindles, an intermediate outer axle and an inner axle, arranged concentrically of the outer axle and provided such that the inner axle interconnects the axle spindles by fastening means. An axle spindle comprises an axle support portion and a fastener support portion. Respective axle support portion of respective axle spindle is arranged in a pivot axle fastener. The pivot axle fasteners may in turn be arranged to any structural element to which it is desirable to arrange a pivot axle arrangement. This is further disclosed in the figures and related detailed description.

According to examples of the present disclosure the first and second axle support portion has smaller cross sectional area, also referred to as a transverse area, than a cross sectional area of the first and second fastener support portion.

The outer axle has a first inner diameter and the first and second end portion arrangements have a second axle inner diameter. According to examples of the present disclosure the second axle inner diameter is smaller than the first axle inner diameter. This means that a through-hole extending through respective end portion arrangement is narrower than the through-hole extending through the outer axle, which as previously stated also is in form of a hollow cylinder. The first and second end portion arrangements may either be a part of the outer axle, formed from the same piece of material according to any possible manufacturing method, or be separate parts mounted at respective opposite first and second ends of the outer axle.

According to other examples of the present disclosure the first and second end portion arrangement is configured to be arranged at least partially inside the outer axle. Thus, at least a portion of the first and second end portion arrangement has a smaller outer diameter than the first inner axle diameter of the outer axle. This means that the first and second end portion arrangements either may be mounted inside of the outer axle at respective first and second end or that at least a portion of the first and second end portion arrangements extends into respective first and second end of the outer axle.

By providing the outer axle with a first and second end portion arrangement at respective first and second end of the outer axle it is not necessary that the axle support portions of the axle spindles are configured directly according to the first inner diameter of the outer axle. The important aspect is that respective end portion arrangement is configured according to respective axle support portion, including the bearing element, of the axle spindle. This may be advantageous from a mounting and manufacturing perspective.

According to yet other examples of the present disclosure the first and second end portion arrangements are just an outer portion of the first and second ends of the hollow cylinder forming the outer axle. According to these examples the first inner diameter and the second inner diameter is the same. This is a very easy, and less costly, approach.

According to other examples of the present disclosure the first and second axle spindle additionally comprises a first and second abutting portion. The first and second abutting portion is provided between respective first or second axle support portion and respective first or second fastener support portion. A surface of the abutting portion is essentially perpendicular to an outer surface of the axle support portion and the fastener support portion.

According to yet other examples of the present disclosure the first or second bearing element comprises of at least one plain bearing. According to other examples the first or second bearing element additionally comprises a first and second radial bearing flange. The first and second radial bearing flange extends in a radial direction, wherein the radial direction is essentially perpendicular in relation to the longitudinal extension direction of the first or second bearing element.

The radial bearing flanges are provided to form bearings between the axle spindles and the outer axles, or to be more precise to form bearing between respective abutting portion of respective axle spindle and a transverse surface of respective end portion arrangement of the outer axle. The transverse surfaces are the cross sectional surfaces of the outer axle at respective end portion arrangement. Thus, the transverse surfaces of the outer axle are provided at respective end of the outer axle essentially perpendicular to the longitudinal direction of the outer axle.

The first and second radial bearing flanges are provided for absorbing forces in axial direction. In order not to wear on respective abutting portion, and/or to form a surface against which the transverse end surface of the end portion arrangement of the outer axle can rotate, when axial forces, e.g. generated from load shock or like, are applied it is preferred that respective abutting portion is covered by a radial bearing flange. The radial bearing flanges are preferably covering at least the part of respective abutting portion against which the transverse surface of the end portion arrangement abuts.

Depending on how the pivot joint, comprising the pivot axle arrangement and pivot axle fasteners is used, and depending on in which application the pivot joint is used, the wear of the radial bearing flange and the part of the bearing element extending in the axial direction, and thus enclosing at least a longitudinal portion of the axle support portion of the axle spindle, may be significantly different. Thus, according to some examples of the present disclosure the radially extending portion of the bearing element and the axially extending portion of the bearing element may be two separate bearings, together forming the bearing element. Having the radially extending portion separate from the axially extending portion enables that, if e.g. the wear of the radially extending portion is more severe than the wear of the axially extending portion, the radially extending portion can be replaced more frequently than the axially extending, or vice versa. This may save cost and also, just replacing the radially extending portion may require less structural engagement. There are also other obvious configurations, with different obvious advantages and drawbacks, of how the bearing element may be designed, all which are considered to fall under the wide concept of bearing element. E.g. the bearing element may not consist of one plain bearing but of two, layered plain bearings. Such configuration may be advantageous from a durability perspective.

According to examples of the present disclosure the first and second fastener support portion and the first and second axle support portion are formed as essentially hollow cylinders, wherein a through-hole is formed in the longitudinal direction of respective fastener support portion. As will be disclosed more in detail later, for certain examples of the present disclosure this is an important feature in order to be able to mount the pivot axle arrangement. Further, the first axle support portion is provided with a first attachment portion and the second axle support portion is provided with a second attachment portion. The first and second attachment portions are forming a surface covering the cross sectional area of respective first or second support portions in which the first and second fastening means is fastened. The attachment portions are provided perpendicularly, or near perpendicular, to a longitudinal direction of respective axle support portion.

The attachment portion may be provided either within the cylinder formed by the fastener support portion or within the cylinder formed by the axle support portion. According to certain examples of the present disclosure the attachment portion is provided at the outer end of the axle support portion that is closest to the fastener support portion. According to other examples the attachment portion is provided at the outer end of the axle support portion that is facing away from the fastener support portion.

Providing the attachment portion at the outer end that is closest to the fastener support portion may be advantage from a stability and assembling perspective whereas providing the attachment portion at the outer end that is facing away from the fastener support portion may be advantage since the inner axle can be shorter, which may improve stability.

According to other examples of the present disclosure at least one of the first and second fastening means is provided with adjustment means. The adjustment means are configured for adjusting the pressure exerted by the abutting portion on the end portion arrangement of the outer axle. In examples of the present disclosure where the bearing elements comprise radial bearing flanges the force exerted by the abutting portion on the end portion arrangement will be exerted via respective radial bearing flange which is provided between the abutting portion and the end portion arrangement, i.e. between the abutting portion and the transverse surface of the abutting portion. By controlling the pressure the abutting portion is exerting on the end portion arrangements of the outer axle it is possible to ensure that the construction is free of glitches and to control the friction between the radial bearing flange of the bearing element and the end portion arrangements, thus the tendency for the outer axle to rotate on the bearing elements of the first and second axle spindle. This may be an important feature since when raising, and especially lowering, a radar antenna or like it is preferred that the raising/lowing is performed in a controlled manner. This is facilitated if the friction between the abutting portions and the end portion arrangements can be controlled. Examples of adjustment means are provided in the following.

The presence of adjustment means enables that the pressure, and thus the friction, between the abutting portion of the axle spindle and the transverse surface of the outer axle, preferably via the radial bearing flange of the bearing element, may be kept on a constant level and that glitches can be avoided also as the radial bearing flange is worn. By re-tensioning, i.e. applying additional pressure, of the fastening means it is possible to compensate for possible loss of pressure force due to worn bearing.

In order to control the tendency for the outer axle to rotate it is sufficient that one of the first and second fastening means is provided with adjustment means. However, if both fastening means are provided with adjustment means this may be advantageous since possible wear will be reduced and/or evenly distributed between the two fastening means. The controllability is also improved if both fastening means are provided with adjustment means.

In the following a few examples of how respective end of the inner axle may be fastened by examples of fastening means to respective axle spindle is provided. The fastening means are provided for fastening respective end of the inner axle to the attachment portions.

According to a first example of the present disclosure at least one of the first or second fastening means, arranging one of the inner axle ends to one of the attachment portions of one of the axle support portions or directly to one of the axle support portion, wherein the axle support portions are part of respective axle spindles, comprises:

that a threaded opening is provided in the axle support portion directly or in the attachment portion of the axle support portion, and that at least one of the first and second inner axle ends are provided with an outwardly threaded end, wherein the threaded opening and the outwardly threaded end are configured such that the outwardly threaded end may be screwed into the threaded opening, thereby fastening the end of the inner axle to the attachment portion or axle support portion. The threaded opening may either penetrate a portion of the attachment portion or axle support portion or penetrate right through the attachment portion or axle support portion.

Fastening means as the most recently described has the advantage that no additional components are needed for fastening an inner axle end to the attachment portion or axle support portion. Also, this first example of the present disclosure does not require access the opposite side of the attachment portion or axle support portion than from which the inner axle is fastened, for fastening the inner axle end to the attachment portion or axle support portion.

According to a second examples of the present disclosure at least one of the first or second fastening means, arranging one of the axle ends to one of the attachment portions of one of the axle support portions, wherein the axle support portions are part of respective axle spindles, comprises:

that the first or second attachment portion is provided with a second opening, that the inner axle is provided with an outwardly threaded end, and a screw-nut, wherein when the pivot axle arrangement is assembled the outwardly threaded end is guided through the second opening and the screw-nut is screwed onto. The screw-nut is mounted on the outwardly threaded end from the opposite side of the attachment portion than from which the inner axle is guided. When the screw-nut is mounted on the outwardly threaded end the screw-nut is locking the outwardly threaded end from being retracted out of the second opening. A washer may also be used in combination with the screw-nut.

Fastening means as the most recently described is a very simple, robust and reliable way of fastening an inner axle end to an attachment portion. Further, according to some examples the outwardly threaded end is configured such that when the inner axle end is fastened to the attachment portion of the axle support portion not all threading of the outwardly threaded end is used. By controlling the torque used when applying the screw-nut and by having the option to screw the screw-nut further onto the threaded end, thus tightening the screw-nut further, the fastening means provides the adjustment functionality of an adjustment means. By tightening the screw-nut the pressure force between the abutting portion of the axle spindle and the end portion arrangement of the outer axle, preferably via a radial bearing flange of a bearing element, will be increased and thus, the pressure force and friction can be controlled. The tightening operation is preferably performed by using a tool such as a torque wrench or like.

According to a third examples of the present disclosure at least one of the first or second fastening means, arranging one of the inner axle ends to one of the attachment portions of one of the axle support portion, wherein the axle support portions are part of respective axle spindles, comprises:

that the attachment portion is provided with a first opening, that the inner axle is provided with an inner axle threaded opening in one of the inner axle ends, and an outwardly threaded member with a head, wherein when the pivot axle arrangement is assembled said outwardly threaded member is configured to be guided through said first opening and screwed into the inner axle threaded opening, preferably in combination with a washer, from the opposite side of the attachment portion than from which the inner axle is arranged. Further, the head, or at least the washer if present, has a larger outer circumference than an inner circumference of the first opening such that when the outwardly threaded member is screwed into the inner axle threaded opening the outwardly threaded member is locking the inner axle from being retracted out of the first opening.

Fastening means as the most recently described also has the advantage that such fastening means also may be used to provide the adjustment functionality of an adjustment means. By controlling the tightening torque of the outwardly threaded member, which is dependent on how far into threaded opening the threaded member is screwed, it is possible to control the friction between the abutting portion, via the radial bearing flange if such is present, and respective end portion arrangement. Thus, as has been disclosed previously, the tightening operation is preferably performed by using a tool such as a torque wrench or like. Naturally, in order for the latter fastening means to provide the functionality of adjustment means the threaded opening and the outwardly threaded member has to be configured accordingly, meaning that it has to be possible to screw the outwardly threaded member further into the threaded opening of the inner axle.

According to other examples of the present disclosure at least one of the first and second inner axle ends is provided with a holding flange. The holding flange is configured to engage with an assembling tool. Such holding flange and assembling tool are advantageously used when the pivot axle arrangement is assembled.

Further, the pivot axle arrangement may be assembled by using a method, wherein the method comprises the steps of:

mounting a first end of an outer axle to a first axle spindle, wherein a first bearing element is arranged between said first axle spindle and a first end portion arrangement of said outer axle, assembling a first end of an inner axle to the first axle spindle by means of a first fastening means, arranging an assembling tool to a second end of the inner axle such that the inner axle may be held in a first position suitable for mounting a second axle spindle, aligning a second opening of the second axle spindle with an longitudinal direction of the assembling tool, wherein the assembling tool is configured to be fit into the second opening, guiding the second axle spindle along the assembling tool such that:
- a second end of the inner axle is adjacent to the second opening, and
- a second end portion arrangement of the second end of the outer axle is mounted to the second axle spindle via a second bearing element, and fastening the second end of the inner axle to the second axle spindle by means of a second fastening means.

The assembling tool is arranged to the second end of the inner axle by means of a tool fastening arrangement which is configured to interconnect to an end of the assembling tool. The tool fastening arrangement may be in form of a square protruding flange or like.

According to other examples of the present disclosure a first fastener support portion is mounted in a first pivot axle fastener and a second fastener support portion is mounted in a second pivot axle fastener. The pivot axle arrangement, amongst others comprising the fastener support portions of the axle spindles and the outer axle, and the pivot axle fastener together form a pivot joint. The pivot axle fasteners may e.g. be mounted on the roof of a terrain vehicle and an antenna or like may be mounted to the axle such that the antenna is pivotal in relation to the terrain vehicle.

The present disclosure also refers to a radar antenna arrangement comprising a pivot axle arrangement according to the present disclosure. According to an exemplary embodiment of such radar antenna arrangement the antenna arrangement comprises a first and a second structural element. The first structural element may be in form of a fastening structure, wherein said fastening structure comprises two pivot axle fasteners, wherein the pivot axle arrangement is mountable to the fastening structure by said pivot axle fasteners. The first structural element may comprise a mast and a transmitting device, wherein the mast is arranged to the pivot axle arrangement and wherein the transmitting device is arranged to the mast. The arrangement provides that the first and second structural elements, thus the fastening structure and the mast, are pivotally arranged to each other by said pivot axle arrangement. The present disclosure further refers to a vehicle comprising the previously described radar antenna arrangement.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the present disclosure.

DETAILED DESCRIPTION OF EXAMPLE EMBODIMENTS OF THE DISCLOSURE

Figure 1:
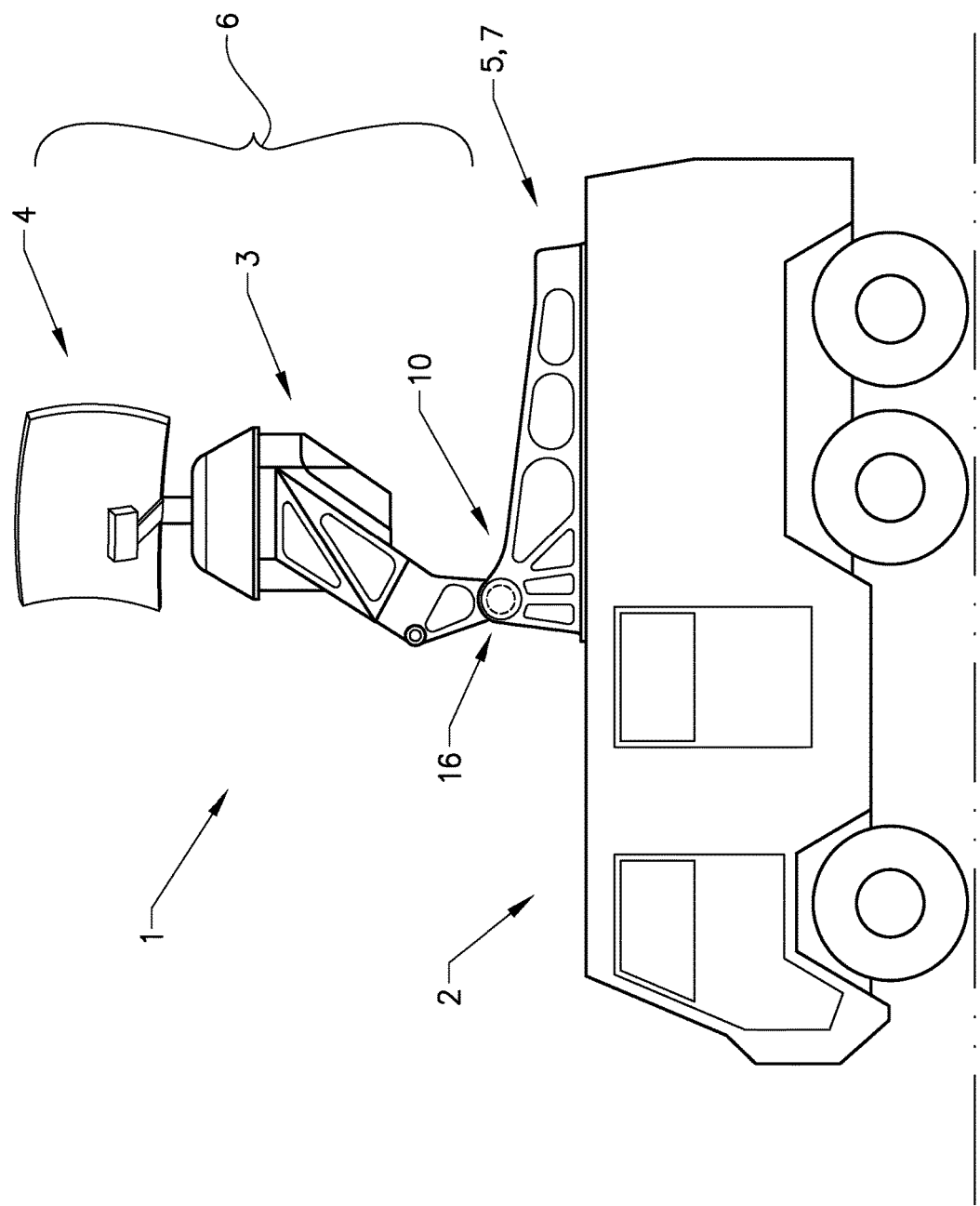
FIG. 1 shows an exemplary application of the present disclosure.

FIG. 1 shows an embodiment of how the present disclosure may be implemented. FIG. 1 shows radar antenna arrangement 1 pivotally arranged to the roof of a terrain vehicle 2. The pivot functionality is provided by arranging a pivot axle arrangement 10, to which a first structural element 6 comprising a mast 3 with a transmitting device 4 is arranged, in pivot axle fasteners 16, wherein the pivot axle fasteners 16 are part of a fastening structure 5 arranged to the roof of the terrain vehicle 2, wherein the fastening structure 5 is an example of a second structural element 7. The embodiment shown in FIG. 1 is just one example of the many applications in which a pivot axle arrangement 10 according to the present disclosure may be used and should not be considered as limiting for the present disclosure.

Figure 2:
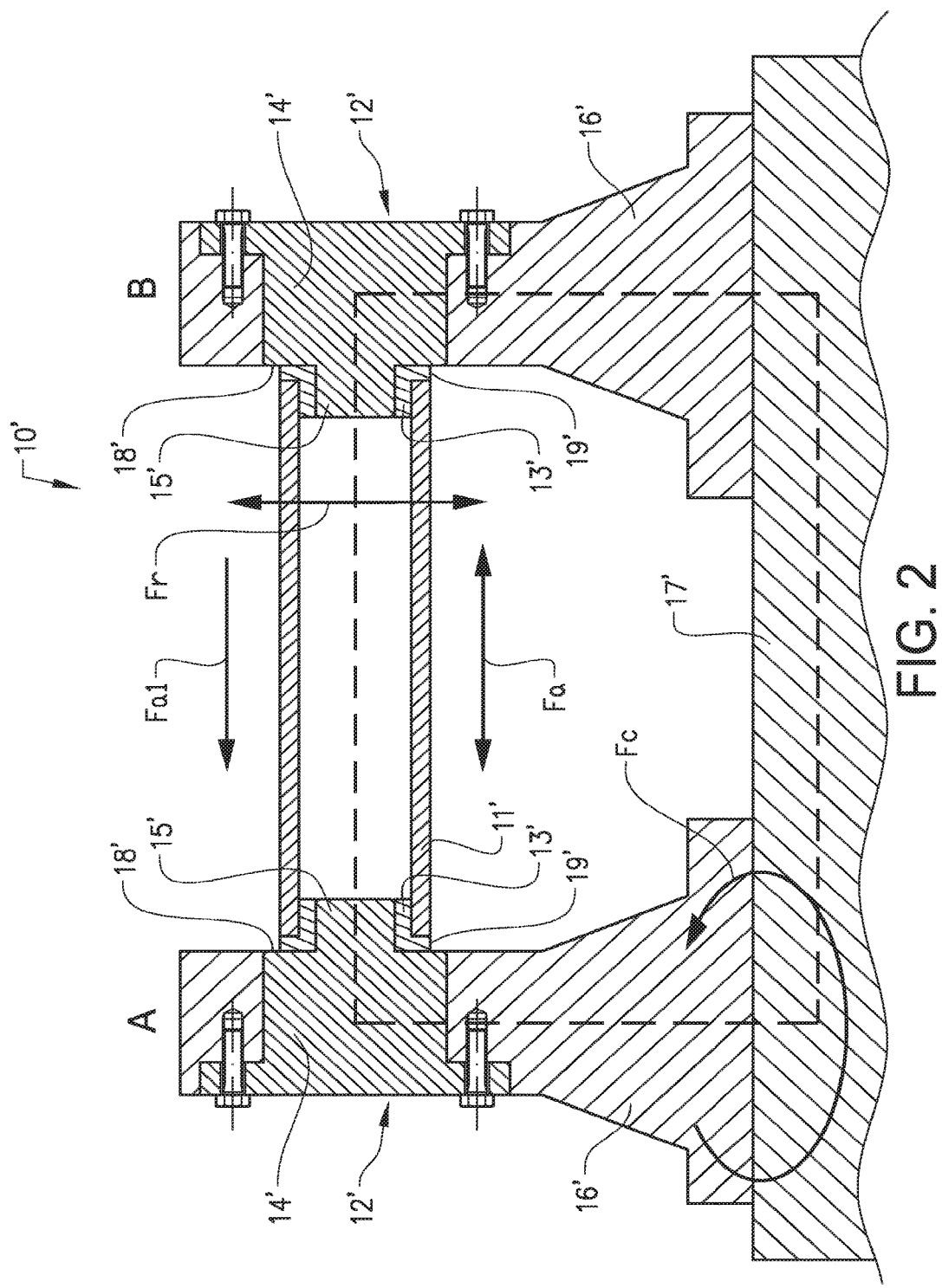
FIG. 2 shows a conventional pivot joint according to prior art.

FIG. 2 shows a prior art pivot axle arrangement 10'. The prior art pivot axle arrangement 10' comprises a hollow, cylindrical axle 11' arranged to an axle spindle 12' at respective end of the cylindrical axle 11'. The axle spindles 12' comprise a fastener support portion 14' and an axle support portion 15' each, wherein the axle support portions 15' are cylindrical and have smaller cross sectional areas than the fastener support portions 14'. Respective axle support portions 15' are additionally provided with a bearing 13' each, wherein the bearings 13' are arranged circumferentially of respective axle support portion 15'. The bearings 13' are generally formed as circular tubes or, as in the prior art shown in FIG. 2, as a circular tube with a circumferentially, radially extending flange 19'. When mounted the radially extending flange 19' of respective end is provided between an abutting portion 18' of the axle spindle 12', wherein the abutting portion 18' is provided perpendicular to an outer surface of the fastener support portion 14' and to an outer surface of the axle support portion 15', and a transverse surface 19' of the cylindrical axle 11'. The radially extending flange 19' of the bearing 13' is configured to absorb forces exerted by the cylindrical axle 11' and/or the axle spindle 12' in axial direction. The axle support portions 15' further has a smaller outer diameter than an inner diameter of the cylindrical axle 11'. The thickness of respective bearing 13' is configured such that when respective bearing 13' is arranged to respective axle support portion 15' the axle support portion 15' comprising the bearing 13' can be arranged to protrude into respective end of the cylindrical axle 11' such that the cylindrical axle 11' is rotationally arranged to the axle support portions 15' comprising the bearings 13', wherein the outside of respective bearings 13' form a rotational surfaces in relation to the respective inner surface of the cylindrical axle 11'. Naturally, depending on the configuration of the bearings 13' the rotational surface may also be formed between the inside of respective bearings 13' and respective axle support portion 15'.

Further, as is disclosed in FIG. 2, the fastener support portions 14' of respective axle spindle 12' is arranged in a respective pivot axle fastener 16', wherein the pivot axle fasteners 16' are arranged to a structural element 17'. The two pivot axle fasteners 16' are denoted A and B. The structural element 17' may e.g. be the roof of a terrain vehicle, the platform of a truck or like.

A general problem with pivot axle arrangements 10' as disclosed in FIG. 2 is that the arrangement first and foremost is configured to absorb forces in radial direction Fr. Forces in radial direction Fr may be absorbed by both axle spindles 12', and thereby by both pivot axle fasteners 16'. Forces in axial direction Fa can however only be absorbed at either one of the axle spindles 12', i.e. an axial force Fa1 will only be absorbed by the axle spindle 12' at pivot axle fastener 16' A.

When the pivot axle arrangement 10' is utilized in an application as disclosed in FIG. 1, thus when used to provide the ability to lower and raise a radar antenna 1 or like, the forces in radial direction Fr the pivot axle arrangement 10' is exposed to may be significant due to the significant height and weight the radar antenna 1 or like may have. Naturally also the pivot axle fasteners 16' and the structural element 17' need to be configured to withstand the forces the cylindrical axle 11' is exposed to in radial direction Fr.

However, also the forces in axial direction Fa the pivot axle arrangement 10' may be exposed to may be significant. Referring to the exemplary embodiment of FIG. 1 again, when in a lowered position and when driving on a bumpy road load shocks, curve taking etc. may imply that significant axial forces Fa are developed. This entails that respective pivot axle fastener 16' is required to be able to absorb significant forces and needs to have both sufficiently high breaking point and be sufficiently rigid. If a pivot axle fastener 16' is not having sufficiently high breaking point the pivot axle fastener 16' may ultimately break when being exposed to peak load. If a pivot axle fastener 16' A is not sufficiently rigid, and if it flexes when being exposed to axial load Fa1, glitches in axial direction may be formed severely impairing the functionality of the pivot axle arrangement 10'.

The significant forces in axial direction Fa a pivot axle fastener 16' may be exposed to also requires that the structural element 17' the pivot axle fastener 16' is fastened to can absorb significant forces. Looking at a simplified example; the axial force Fa1 directed in axial direction towards the pivot axle fastener 16' A may propagate through the construction via the pivot axle fastener 16' A to the structural element 17', wherein, in simplified terms, the pivot axle fastener 16' A may exert a twisting force Fc on the structural element 17' (in addition to e.g. forces in radial direction Fr). Thus, also the structural element 17' is required to withstand significant forces.

In order for the pivot axle fasteners 12', and the pivot axle fasteners 16', to have sufficiently high breaking point and be sufficiently rigid e.g. the thickness of the material may have to be increased and other materials may have to be used. This may add additional cost, additional weight and make the component as such more bulky. In order for the structural element 17' to withstand the significant forces the structural element 17' is exposed to also the properties of the structural elements 17' has to be adapted to be stronger, thicker, more durable etc. This will also make the structural element 17' more bulky, heavier etc. and ultimately this may lead to that it is impossible to implement the prior art pivot axle arrangement 10' for certain applications, such as e.g. light weight vehicles.

It should be noted that in FIG. 2 and related description the forces the pivot axle arrangement 10' is exposed to is referred to and described in a very general way. The forces referred to are referred to in order to clarify the fundamental principle of the arrangement. It is considered to be known for a person skilled in the art the magnitude, direction etc. of the forces such system is exposed to is far more complex, and dependent on far more parameters than is mentioned herein in reality.

Figure 3:
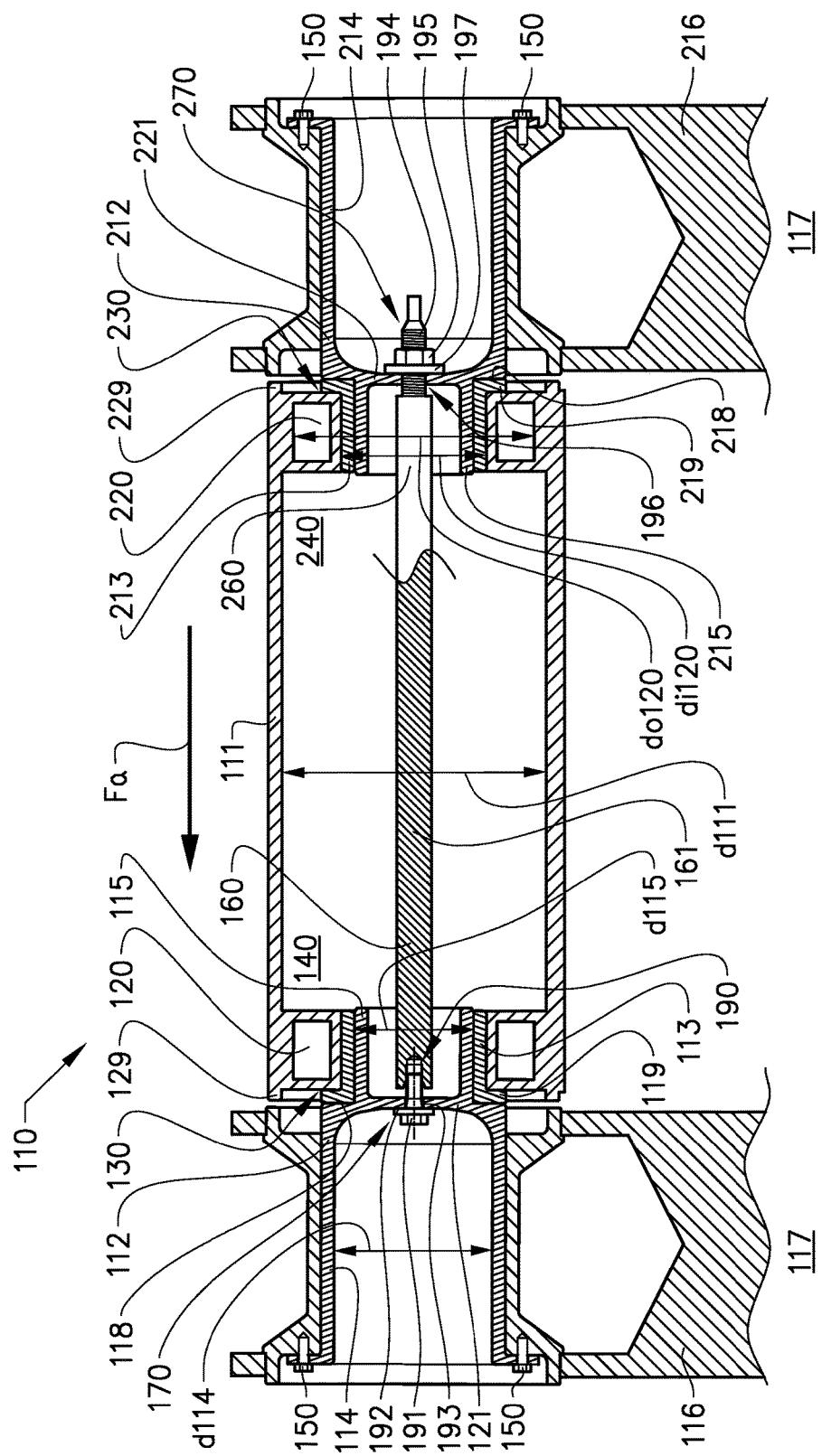
FIG. 3 shows an exemplary embodiment of the present disclosure.

FIG. 3 shows an exemplary embodiment of a pivot axle arrangement 110 of the present disclosure. The pivot axle arrangement 110 comprises an outer axle 111, a first axle spindle 112 and a second axle spindle 212. The first axle spindle 112 comprises a first fastener support portion 114, wherein the first fastener support portion 114 is arranged in a first pivot axle fastener 116. The second axle spindle 212 comprises a second fastener support portion 214, wherein the second fastener support portion 214 is arranged in a second pivot axle fastener 216. The first and second pivot axle fasteners 116, 216 are arranged to an unidentified structural element 117. Such structural element 117 may e.g. be a roof of a terrain vehicle or like. The first and second fastener support portions 114, 214 of the first and second axle spindles 112, 212 are fastened in respective pivot axle fastener 116, 216 by fastening means, in the exemplary embodiment of FIG. 3 in form of screws 150.

The outer axle 111 comprises a first end portion arrangement 120 in a first end 140 of the outer axle 111 and second end portion arrangement 220 in a second end 240 of the outer axle 111. In the exemplary embodiment of FIG. 3 the first and second end portion arrangements 120, 220 are in form of hollow cylinders provided inside and at respective end 140, 240 of the outer axle 111. A first and second transverse surface 130, 230 is formed by an outer surface, wherein respective outer surface is essentially perpendicular to the longitudinal direction of the outer axle 111, at respective end portion arrangement 140, 240.

Respective transverse surface 130, 230 of respective end portion arrangement 120, 220 may be flat or, as according to the embodiment shown in FIG. 3, comprise a flange 129, 229 in order to reduce the glitch between respective end portion arrangement 120, 220 and respective pivot axle fastener 116, 216.

The first and second axle spindles 112, 212 further comprises a first and second axle support portion 115, 215. According to the embodiment shown in FIG. 3 is an outer diameter of the axle support portions d115 smaller than an outer diameter of the fastener support portions d114. Between respective first and second axle support portions 115, 215 and respective first and second fastener support portion 114, 214 a first and second abutting portion 118, 218 is provided, wherein respective surface of the first and second abutting portions 118, 218 are essentially perpendicular to an outer surface of the respective first and second axle support portions 115, 215 or respective first and second fastener support portions 114, 214.

Further, the first and second axle support portions 115, 215 are provided with a first and second bearing element 113, 213. According to the embodiment disclosed in FIG. 3 respective first and second bearing element 113, 213 comprises a respective first and second radial bearing flange 119, 219, extending in a radial direction from respective first and second bearing element 113, 213. Respective first and second bearing element 113, 213 comprising respective first and second radial bearing flange 119, 219 are arranged between respective first and second abutting portion 118, 218 of respective first and second axle spindle 112, 212 and respective first and second transverse surface 130, 230 of respective first and second end portion arrangements 120, 220 of the outer axle 111.

In the embodiment shown in FIG. 3 respective bearing elements 113, 213, comprising respective radial bearing flanges 119, 219, are plain bearings, wherein they form sliding surfaces between respective first and second end portion arrangement 120, 220 of the outer axle 111 and respective first and second axle spindle 112, 212. According to a preferred embodiment the outer axle 111 with respective end portion arrangements 120, 220 is moving in relation to respective bearing element 113, 213 whereas respective bearing element 113, 213 is fixated in relation to respective axle spindle 112, 212.

Respective first and second axle spindles 112, 212 are also provided with a respective first and second attachment portion 121, 221. The first and second attachment portions 121, 221 are forming a portion with a surface, wherein the surface is essentially perpendicular to a longitudinal direction of respective axle spindle 112, 212, covering the cross sectional are of respective first and second axle spindles 112, 212.

Essentially centrally, in a longitudinal direction, of the outer axle 111 an inner axle 161 is provided. In a first end 160 of the inner axle 161 the inner axle 161 is provided with a first fastening means 170 and in a second end 260 of the inner axle 161 the inner axle is provided with a second fastening means 270, wherein the first fastening means 170 is fastened to the first attachment portion 121 and the second fastening means 270 is fastened to the second attachment portion 221.

The first fastening means 170 comprises an inner axle threaded opening 190, an outwardly threaded member 191 and a first opening 193 in the first attachment portion 121. According to the embodiment shown in FIG. 3 the first fastening means 170 also comprises a washer 192 provided between the head of the outwardly threaded member 191 and the first attachment portion 121. The first fastening means 170 is configured such that the outwardly threaded member 191 is arranged from a side of the attachment portion 121 not facing the inner axle 161, through the first opening 193 in the first attachment portion 121 and into the threaded opening 190 of the inner axle 161 such that the first end 160 of the inner axle 161 is fastened, preferably by means of screwing, to the first attachment portion 121.

The second fastening means 270 comprises an outwardly threaded end 194 of the inner axle 161, a screw-nut 195 and a second opening 196 in the second attachment portion 221. According to the embodiment shown in FIG. 3 the second fastening means 270 also comprises a washer 197 provided between the screw-nut 195 and the second attachment portion 221. The second fastening means 270 is configured such that the outwardly threaded end 194 of the inner axle 161 extends through the second opening 196 of the second attachment portion 221 and the screw-nut 195, preferably with the washer 197 as in the embodiment of FIG. 3, is fastened, preferably by means of being screwed onto the outwardly threaded end 194, to the outwardly threaded end 194 such that the second end 260 of the inner axle 161 is fastened to the second attachment portion 221. The screw-nut 195, and the washer 197, must be arranged from a side of the second attachment portion 221 not facing the inner axle 161.

The preferred embodiment of the present disclosure disclosed in FIG. 3 has the advantage that at least one of the used fastening means 170, 270 have the functionality of an adjustment means.

Referring now to the second fastening means 270 of FIG. 3;

By configuring the second fastening means 270 such that the screw-nut 195 can be further tightened, thus that the screw-nut 195 can be further screwed onto the outwardly threaded end 194 of the inner axle 161, when the inner axle 161 is fastened to second attachment portion 221, as is disclosed in the embodiment shown in FIG. 3, the propensity of the outer axle 111 to rotate can be controlled. As the screw-nut 195 is further tightened the contact pressure between respective first and second radial bearing flange 119, 219 of respective first and second bearing element 113, 213 and respective first and second transverse surface 130, 230 of respective first and second end portion arrangement 120, 220 is increased. When the contact pressure is increased the friction between respective first and second radial bearing flange 119, 219 and respective first and second transverse surface 130, 230 increases and thus the propensity of the outer axle 111 to rotate will decrease. This means that a higher force has to be applied on order for the outer axle 111 to rotate.

Other adjustment means work in a similar way, the more they are tightened, the higher will the contact pressure be and the higher force has to be applied on order for the outer axle to be rotated in relation to the axle spindles.

Also the first fastening means 170 may provide this adjustment means functionality if the outwardly threaded member 191 and the threaded opening 190 of the first end 160 of the inner axle 161 is configured such that when the first end 160 of the inner axle 161 is fastened to the first attachment portion 170 the outwardly threaded member 191 can still be further screwed into the threaded opening 190.

Further, according to the embodiment disclosed in FIG. 3 an axle inner diameter d111 of the outer axle 111 is larger than an inner diameter d120 of the first and second end portion arrangements 120, 220.

The present disclosure has the advantage, unlike a prior art pivot axle arrangement as the one disclosed in relation to FIG. 2, that when the pivot axle arrangement 110 is exposed to an axial force Fa both bearing elements 113, 213 of both axle spindles 112, 212, and thus both pivot axle fasteners 116, 216, contribute to absorbing the axial force Fa. This is enabled by that the inner axle 161, fastened at respective first and second end 160, 260 to respective first and second attachment portion 121, 221 of respective first and second axle spindle 112, 212 by the first and second fastening means 170, 270, interconnects the first and second axle spindles 112, 212.

Distributing the absorption of axial forces between both axle spindles 112, 212 and both pivot axle fasteners 116, 216 has the advantage that respective axle spindle 112, 212 and respective pivot axle fastener 116, 216 will be exposed to lower forces and consequently does not have to be dimensioned to withstand as high forces. Also, the pivot axle arrangement 110 becomes more rigid which increases the natural frequency of the system. Thus, possible other, less costly materials may be used and the material thickness does not need to be as high. Also, the structural requirements on the structural element 117 to which the pivot axle arrangement 110 is arranged, are less stringent.

Figure 4:
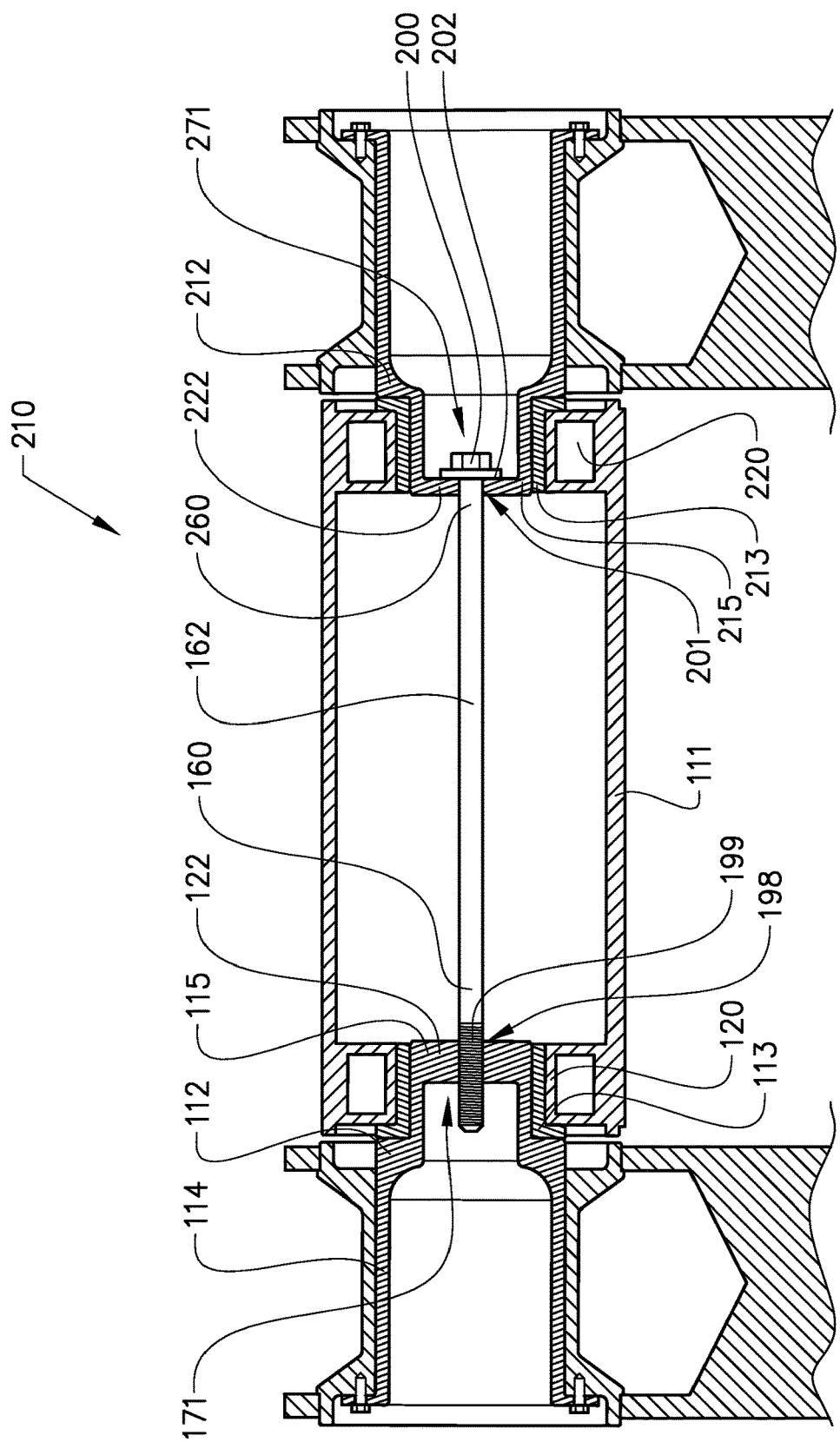
FIG. 4 shows another exemplary embodiment of the present disclosure.

FIG. 4 shows a further exemplary embodiment of a pivot axle arrangement 210 of the present disclosure, disclosing the same features as disclosed for the embodiment disclosed in FIG. 3 with a few, below stated, exceptions.

First of all, an inner axle 162 of FIG. 4 differs from the inner axle 161 as disclosed in FIG. 3 in that the inner axle 162 is provided with an outwardly threaded portion 199 in the first end 160 and with a head 200 in the second end 260. Also, respective first and second attachment portions 122, 222 are provided at an end of respective first and second axle support portion 115, 215 of respective first and second axle spindle 112, 212 opposite to the end as of FIG. 3, meaning the end of respective axle support portion 115, 215 being closest to the inner axle 162.

Thus, in addition to the outwardly threaded portion 199 a first fastening means 171 of FIG. 4 comprises a threaded opening 198 of the first attachment portion 122, wherein when the inner axle 162 is fastened to the first attachment portion 122 the outwardly threaded portion 199 of the inner axle 162 is screwed into the threaded opening 198 of the first attachment portion 171. A second fastening means 271 disclosed in FIG. 4 comprises that a head 200 of the inner axle 162, wherein the second end of the inner axle 260 extends through a third opening 201 of the second attachment portion 222 abuts, preferably via a washer 202 as disclosed in FIG. 4, a side of the second attachment portion 222 not facing the inner axle 162.

In the embodiment disclosed in FIG. 4 the first fastening means 171 has the functionality of an adjustment means in that it can be controlled to what degree the outwardly threaded end 199 of the inner axle 162 is screwed into the threaded opening 198 of the first attachment portion 171, thereby controlling the friction between respective first and second bearing elements 113, 213 and respective first and second end portion arrangements 120, 220 of the outer axle 111.

The first attachment portion 122 of the embodiment disclosed in FIG. 4 may be of different thickness, in the most extreme case extending from the longitudinal end of the first axle support portion 115 facing the inner axle 162 to the longitudinal end of the first fastener support portion 114 facing away from the inner axle 162. Also, for the first fastening means 171 disclosed in FIG. 4 it is not essential that the outwardly threaded end 199 of the inner axle 162 is accessible from the side of the first attachment portion 122 facing away from the inner axle 162. However, if the outwardly threaded end 199 of the inner axle 162 is accessible from the side of the first attachment portion 122 facing away from the inner axle 162 it is possible to improve the first fastening means 171 by applying a screw-nut to the outwardly threaded end 199 extending through the first attachment portion 122 for increased fastening.

Figure 5:
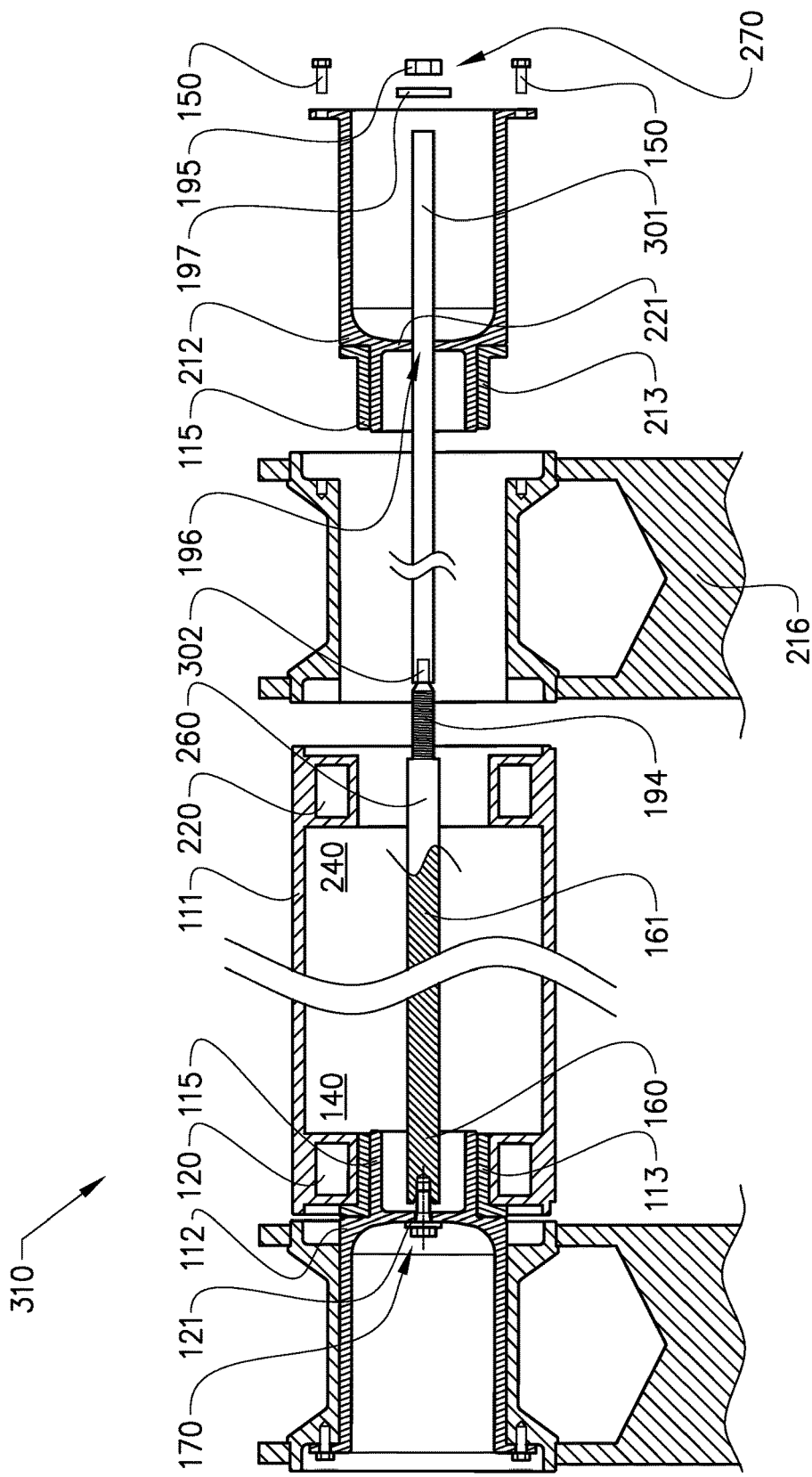
FIG. 5 shows an exemplary disclosure during assembly.

Referring now to FIG. 5, disclosing a schematic view of the assembling of a pivot axle arrangement 310 according to the present disclosure. In FIG. 5 the first end 160 of the inner axle 161 is arranged to the first attachment portion axle spindle by the first fastening means 170 and the first end 140 of the outer axle 111 is arranged to the first axle support portion 115, via the first bearing element 113, as described in relation to FIG. 3. In FIG. 5 the second end 260 of the inner axle 161 is about to be fastened to the second axle spindle 212 which in turn is about to be fastened in the second fastener support portion 216. The arrangement of the second axle spindle 212 to the inner axle 161 and the fastener support portion 216 is facilitated by that an assembling tool 301 is used. The assembling tool 301 is arranged to be connected to a tool fastening arrangement 302 of the second end 260 of the inner axle 161, whereby the inner axle 161 can be held in an essentially longitudinal direction, being parallel to the longitudinal direction of the outer axle 111. Further, the assembling tool 301 is configured to such that the second axle spindle 212 can be guided to the right position by letting the assembling tool 301 slide through the second opening 196 of the second attachment portion 221. Finally the screw-nut 195, preferably in combination with a washer 197, is screwed onto the outwardly threaded portion 194 of the second end 260 of the inner axle 161, and the second axle spindle 212 may be fastened to the second fastener support portion 216 by screws 150.

It is to be understood that the present disclosure is not limited to the embodiments described above and illustrated in the drawings; rather, the skilled person will recognize that many changes and modifications may be made within the scope of the appended claims.

The invention claimed is:

1. A radar antenna arrangement, comprising:
   a pivot axle arrangement for providing that two structural elements arranged to said pivot axle arrangement are pivotally movable in relation to each other, said pivot axle arrangement comprising:
      a first and a second axle spindle for holding an outer axle, wherein said first axle spindle comprises a first axle support portion and a first fastener support portion and said second axle spindle comprises a second axle support portion and a second fastener support portion,
      a first and a second bearing element, wherein said first bearing element is arranged to said first axle support portion of said first axle spindle and said second bearing element is arranged to said second axle support portion of said second axle spindle,
      the outer axle, wherein said outer axle is formed as a hollow cylinder and wherein said outer axle is provided with a first and a second end portion arrangement at respective opposite end of said outer axle, wherein also said first and second end portion arrangements are formed as hollow cylinders,
      wherein said first and second end portion arrangement of said outer axle are arranged to said first and second bearing element such that said outer axle is pivotally arranged in relation to said first and second axle spindles,
      wherein: an inner axle, having a first and second inner axle end wherein said first and second inner axle ends are provided on opposite ends of said inner axle, is concentrically arranged in a longitudinal direction inside of said outer axle and in that said inner axle extends between said first and second axle spindle, wherein said first and second inner axle end is fastened to said first and second axle spindle by a first and second fastening means, such that said first and second axle spindle are interconnected via said inner axle
   a second structural element in form of a fastening structure, wherein said fastening structure comprising two pivot axle fasteners, said pivot axle arrangement is mountable to said fastening structure, and
   a first structural element comprising a mast and a transmitting device, wherein said mast of said first structural element is arranged said pivot axle arrangement and wherein said transmitting device is arranged to said mast, wherein said first and second structural element are pivotally arranged to each other by said pivot axle arrangement.

2. The radar antenna arrangement according to claim 1, wherein said first and second axle support portion has smaller cross sectional area than a cross sectional area of said first and second fastener support portion.

3. The radar antenna arrangement according to claim 1, wherein said first and second end portion arrangement has a second axle inner diameter and wherein said second axle inner diameter is smaller than a first axle inner diameter of said outer axle.

4. The radar antenna arrangement according to claim 1, wherein said first and second end portion arrangement is configured to be arranged at least partially inside said outer axle, wherein at least a portion of said first and second end portion arrangement has a smaller outer diameter than a first inner axle diameter of said outer axle.

5. The radar antenna arrangement according to claim 1, wherein said first and second axle spindle additionally comprises a first and a second abutting portion, wherein said first and second abutting portion is provided between respective said first or second axle support portion and respective said first or second fastener support portion.

6. The radar antenna arrangement according to claim 1, wherein at least one of said first or second bearing element comprises at least one plain bearing.

7. The radar antenna arrangement according to claim 1, wherein said at least one of said first or second bearing element comprises a first or second radial bearing flange, wherein such first or second radial bearing flange protrudes in a radial direction, wherein said radial direction is perpendicular or near perpendicular in relation to the longitudinal extension direction of said first or second bearing element, and wherein said first or second radial bearing flange is provided between said first or second abutting portion on a first side of said first or second radial bearing flange and a transverse surface of said outer axle on a second side of said first or second radial bearing flange, wherein said transverse surface is provided perpendicular or near perpendicular to the longitudinal direction of said outer axle.

8. The radar antenna arrangement according to claim 1, wherein said first and second fastener support portion and said first and second axle support portion are formed as essentially hollow cylinders, and wherein said first axle support portion comprises a first attachment portion and said second axle support portion comprises a second attachment portion, wherein said first and second attachment portions are forming a surface covering the cross sectional area of respective said first or second axle support portions in which said first and second fastening means is fastened.

9. The radar antenna arrangement according to claim 8, wherein said first or second attachment portion is provided at the outer end of said first or second axle support portion that is closest to the first or second fastener support portion.

10. The radar antenna arrangement according to claim 1, wherein at least one of said first and second fastening means is provided with adjustment means, wherein said adjustment means are configured for adjusting the pressure exerted by said first or second abutting portion on said first or second end portion arrangement.

11. The radar antenna arrangement according to claim 1, wherein at least one of said first or second fastening means, arranging one of said inner axle ends to one of said axle spindles comprises:
that a threaded opening is provided in said axle support portion or in said first or second attachment portion of said first or second axle fastening portion, and
that at least one of said first and second inner axle end is provided with an outwardly threaded end, wherein
said threaded opening and said outwardly threaded end are configured such that said outwardly threaded end may be screwed into said threaded opening.

12. The radar antenna arrangement according to claim 1, wherein at least one of said first or second fastening means, arranging one of said first or second inner axle end to one of said axle spindles comprises:
that said second attachment portion of said second axle support portion is provided with a second opening,
that said inner axle is provided with an outwardly threaded end, and
a screw-nut, wherein
when said pivot axle arrangement is assembled said outwardly threaded end is guided through said second opening and said screw-nut is screwed onto said outwardly threaded end such that said screw-nut is locking said outwardly threaded end from being retracted out of said second opening.

13. The radar antenna arrangement according to claim 1, wherein at least one of said first or second fastening means, arranging one of said inner axle ends to one of said axle spindles comprises:
that said first attachment portion is provided with a first opening,
that said inner axle is provided with an inner axle threaded opening in one of said first or second inner axle ends, and
an outwardly threaded member with a head, wherein
when said pivot axle arrangement is assembled said outwardly threaded member is configured to be guided through said first opening and screwed into said inner axle threaded opening, wherein said head of said outwardly threaded member has a larger outer circumference than an inner circumference of said first opening, such that when said outwardly threaded member is screwed into said inner axle threaded opening said outwardly threaded member is locking said inner axle from being retracted out of said first opening.

14. The radar antenna arrangement according to claim 1, wherein at least one of said first and second inner axle end is provided with a holding flange, wherein said holding flange is configured to engage with an assembling tool.

15. A method for assembling the radar antenna arrangement according to claim 1, wherein said method comprises the steps of:
mounting a first end of an outer axle to a first axle spindle, wherein a first bearing element is arranged between said first axle spindle and a first end portion arrangement of said outer axle,
assembling a first end of an inner axle to said first axle spindle by means of a first fastening means,
arranging an assembling tool to a second end of said inner axle such that said inner axle may be held in a first position suitable for mounting a second axle spindle,
aligning a second opening of said second axle spindle with an longitudinal direction of said assembling tool,
guiding said second axle spindle along said assembling tool such that:
a second end of said inner axle is adjacent to said second opening, and
a second end portion arrangement of said second end of said outer axle is mounted to said second axle spindle via a second bearing element, and
fastening said second end of said inner axle to said second axle spindle by means of a second fastening means.

16. A radar antenna arrangement according to claim 1, further comprising a first and a second pivot axle fastener, wherein said first fastener support portion is mounted in said first pivot axle fastener and said second fastener support portion is mounted in said second pivot axle fastener.

17. A vehicle comprising a radar antenna arrangement according to claim 1.

* * * * *